United States Patent [19] [11] Patent Number: 4,998,787
Caputi et al. [45] Date of Patent: Mar. 12, 1991

[54] METHOD OF FABRICATING A MULTIPLE HOLOGRAPHIC LENS

[75] Inventors: Stephen J. Caputi, Centerport, N.Y.; Douglas S. Hobbs, Chelmsford, Mass.; Benjamin J. Pernick, Forest Hills; Nils J. Fonneland, Lake Ronkonkoma, both of N.Y.; John V. Fine, Sr., Goose Creek, S.C.

[73] Assignee: Grumman Aerospace Corporation, Bethpage, N.Y.

[21] Appl. No.: 253,733

[22] Filed: Oct. 5, 1988

[51] Int. Cl.⁵ .......................... G02B 5/32; G03H 1/28
[52] U.S. Cl. ................................. 350/3.73; 350/3.72; 350/3.77
[58] Field of Search ................. 350/3.73, 3.77, 3.72, 350/3.69, 320

[56] References Cited

U.S. PATENT DOCUMENTS

| | | | |
|---|---|---|---|
| 3,600,056 | 8/1971 | King | 350/3.69 |
| 4,310,216 | 1/1982 | Pellaux | 350/3.72 |
| 4,421,379 | 12/1983 | Grumet et al. | 350/3.72 |
| 4,547,037 | 10/1985 | Case | 350/3.69 |
| 4,701,005 | 10/1987 | Naguchi | 350/3.73 |
| 4,807,978 | 2/1989 | Grinberg et al. | 350/3.77 |
| 4,824,193 | 4/1989 | Maeda et al. | 350/3.72 |
| 4,836,629 | 6/1989 | Huignard et al. | 350/3.73 |
| 4,907,851 | 3/1990 | Marhic | 350/3.7 |

FOREIGN PATENT DOCUMENTS 1342747 1/1974 United Kingdom ............... 350/3.73

OTHER PUBLICATIONS

W. T. Rhodes, "Hologram Copying", Handbook of Optical Holgraphy, Academic Press, Inc., 1979.
A. Kalestynski, "Holographic Multiplication in One Exposure by the Use if a Multibeam Reference Field", Applied Optics 12, 1946 (1973).
S. Nakahara, T. Fujita, and K. Sugihara, "A Study on Simultaneous Machining of Multi-Spot by Holographic Technique", 1976.

Primary Examiner—Bruce Y. Arnold
Assistant Examiner—David R. Parsons
Attorney, Agent, or Firm—Scully, Scott, Murphy & Presser

[57] ABSTRACT

Method of fabricating a coherently exposed multiple holographic lens including a first step of fabricating an incoherently exposed master multiple holographic lens with an array of overlapping holographic lens elements, each of said lens elements having an interference pattern substantially covering the entire area of the lens. The master multiple holographic lens is illuminated with a first beam of light from a coherent source to provide a plurality of light waves equal in number to the number of lens elements in the master lens. The plurality of light waves overlap in a region downstream of the master lens. A holographic recording medium is positioned in the region of overlap such that an area thereon is illuminated simultaneously by each of the plurality of light waves. A second beam of light from a coherent source is directed toward the area of the holographic recording medium illuminated by the plurality of light waves. The holographic recording medium is exposed simultaneously to the second beam of light and the plurality of light waves and is developed to form a coherently exposed multiple holographic lens. A larger area of overlap of the plurality of light waves illuminating to recording medium is provided by an imaging lens positioned to capture and redirect the waves. A one to one image of the master lenses can be recorded by positioning a pair of imaging lens between the master lens and the recording meidum.

12 Claims, 6 Drawing Sheets

METHOD OF FABRICATING A MULTIPLE HOLOGRAPHIC LENS

BACKGROUND OF THE INVENTION

1. Field of the Invention

This invention relates to multiple holographic lenses and more particularly to methods for fabricating a coherently exposed multiple holographic lens.

2. Description of the Prior Art

Multiple holographic lenses are used in optical matched filter correlators to accommodate parallel processing of an input scene with an array of matched filters. The matched filter array represents the stored memory of the correlator and contains information relating to different aspects of the specific target of interest, such as, size and orientation. The optical correlator system detects the presence of an object in a scene or field of view by finding a match between one or more of the images of the selected object stored in the matched filter with the various objects in the scene. In operation, a collimated light beam is spatially modulated by the input scene and directed through a multiple holographic lens. The output of the multiple holographic lens is a matrix of individual beams each of which is spatially modulated with the input scene. All the beams converge towards and pass through individual matched filters in the array for parallel processing by the stored memory array. If a match occurs, the output beams of the matched filter will be of sufficient intensity to produce a bright spot on a light sensitive detector that generates a signal indicating the presence of the selected target.

Traditionally, multiple holographic lenses have been made by what is known as the step and repeat method. A collimated reference beam and a point source object beam are superposed on a recording medium in accordance with well known holographic recording techniques. Upon exposure, the interference pattern of the reference and object beams is recorded thereby forming a holographic lens element on the recording medium. After the first exposure, the medium is moved a small amount in either the x or y direction and a second exposure is made of the superposed object and reference beams. This process is repeated several times until the desired pattern of multiple exposures is made as the medium is translated. Individual holographic lens elements are created by each of the exposures. The multiple holographic lens made in this manner, having an array of independently recorded lens elements, is known as an independently exposed multiple holographic lens.

Several deficiencies in operating performance of the independently exposed multiple holographic lens are present. First, the total intensity of light recorded by the lens is the sum of contributions from each individual lens element. Since the recording medium has a finite contrast range, the intensity of the reference and object beams of each exposure must be reduced to avoid overexposing the medium. The reduction in recording beam intensity results, however, in a reduction in intensity of the playback beam. Secondly, the diffraction efficiency (DE) of the array of lens elements decreases as the number of lens elements in the array (M) increases, approximately in accordance with the formula $DE = 1/(M \times M)$. This feature is a consequence of the additive nature of the intensity recording and finite contrast range of the recording medium. Thirdly, the DE of individual lens elements in the array are not necessarily equal. This lack of uniformity is due to the nonlinear characteristics of the recording medium.

U.S. Pat. No. 4,421,379, assigned to the same assignee as the present invention, discloses a two step process for fabricating a multiple holographic lens wherein the final holographic recording is made with a single exposure. In the first step, all the exposures to be recorded in the final lens are recorded individually in a modified form of the step and repeat method. In this modified form, a mask is placed on the photographic plate to prevent overlap of the exposure areas of the individual lens elements. In the second step, the first multiple lens is illuminated giving rise to divergent refracted beams that interfere with a second beam of light on a second photographic plate to produce the final multiple holographic lens. In this method, while the diffraction efficiency is increased by eliminating cross product distortion terms that may be present when the interference pattern of each lens element overlaps, the first holographic recording suffers from a non-uniformity since small portions of the plate are more sensitive to imperfections. In addition, the effective area of the final multiple holographic lens is limited by the high f-number required for fabrication of the first holographic lens.

SUMMARY OF THE INVENTION

The present invention is directed to method for fabricating a coherently exposed multiple holographic lens in which the first step includes fabricating an uniformly exposed master multiple holographic lens having an array of holographic lens elements. Each of the individual lens elements are formed by recording overlapping interference patterns on a master photographic plate substantially covering the entire area of the plate. The master multiple holographic lens is then illuminated with a first beam of light from a coherent source to provide a plurality of refracted light waves equal in number to the number of lens elements. A holographic recording medium is positioned such that an area of the medium is illuminated simultaneously by each of the plurality of refracted light waves. The plurality of refracted light waves or wavefronts are in the form of an array of coherent light beams that are diverging towards the recording medium. A second beam of light is directed from the coherent source toward the area of the holographic recording medium illuminated by the plurality of refracted light waves. The holographic recording medium is then simultaneously exposed to the second beam of light and the plurality of refracted light waves to coherently record the interference pattern of the second beam and the refracted waves. The holographic recording medium is then developed to form a final coherently or simultaneously exposed multiple holographic lens.

The method according to the present invention avoids the deficiences of the prior art multiple holographic lenses. A coherently exposed multiple holographic lens array does not suffer a decreasing contrast with increasing the number of lens elements. This is a consequence of having light from all of the point sources in the array combined at the same time on the recording medium. In accordance therewith, the resulting interference fringe pattern for the coherent array of lens elements is additive in light amplitude rather than light intensity. Thus, the total light intensity recorded by the coherently exposed multiple holographic lens of the present invention is equal to the square of the sum of the amplitudes of the multiple refracted wavefronts, rather than the sum of the squares of the intensity contributions from each individual lens element as is the case with an individually exposed multiple holographic lens.

In accordance with another embodiment of the present invention, an imaging lens is positioned between the master multiple holographic lens and the recording medium for receiving and redirecting the plurality of refracted light waves towards the recording medium. The imaging lens causes a larger portion of the light in the refracted wavefronts emanating from each of the individual lens elements to completely illuminate an area of the holographic recording medium simultaneously. The imaging lens provides a larger region of overlap of the refracted light beams downstream of the lens which results in the coherent diverging light waves to be superposed over a larger area of the recording medium. The use of a single imaging lens may cause a phase distortion on playback of the coherently exposed multiple holographic lens. In an alternative embodiment of the invention, a second imaging lens is positioned parallel to the first imaging lens between the recording medium and the master multiple holographic lens. The second imaging lens redirects the refracted wavefronts a second time before they reach the recording medium which eliminates the phase distortion.

In accordance with the method of the invention, the illumination of the master multiple holographic lens provides a first plurality of light waves that produces a real holographic image of the lens elements, and a second plurality of light waves that produces a virtual holographic image of the lens elements. In one aspect of the invention, the recording medium is positioned to record the real image. Optionally, the recording medium may be positioned to record the virtual image.

DESCRIPTION OF THE PREFERRED EMBODIMENT

In accordance with the method of the present invention, the initial step comprises fabricating an incoherently exposed master multiple holographic lens by the step and repeat procedure. The lens has an array of lens elements made by a plurality of interference patterns of an object beam and a reference beam being recorded one at a time on a master recording plate having a photographic emulsion. The holographic image of the master lens is then used as the object beam for recording in a single exposure the interference pattern of the array of light waves comprising the object beam and a reference beam on a copy recording plate having a photographic emulsion.

In recording the master lens, achieving a relatively high diffraction efficiency is not a major concern. Uniformity and quality of the individual focal point light distributions of each lens element in the master lens are factors of importance. Uniformity in the focal points of the individual lens elements is necessary so that all of the plurality of light waves emanating from the master lens have uniform intensity. In addition, high quality is essential to limit the amount of distortion. In order to provide this uniformity and quality, the exposures of the master plate are made to cover a relatively small portion of the dynamic range of the characteristic curve of the recording medium. This portion is defined in the relatively linear region of the relationship between the output intensity and the input intensity of the recording medium. Over-exposure of the recording medium would result in the photographic plate becoming completely black whereas under exposure will not produce sufficient energy to record the interference patterns on the copy plate. Furthermore, in fabricating the master lens, the diffraction efficiency of individual lens elements can be tailored by varying the exposure energy for a given lens recording. In addition, the exposure time can also be varied. Thus, a uniform master multiple holographic lens can be fabricated.

Figure 1:
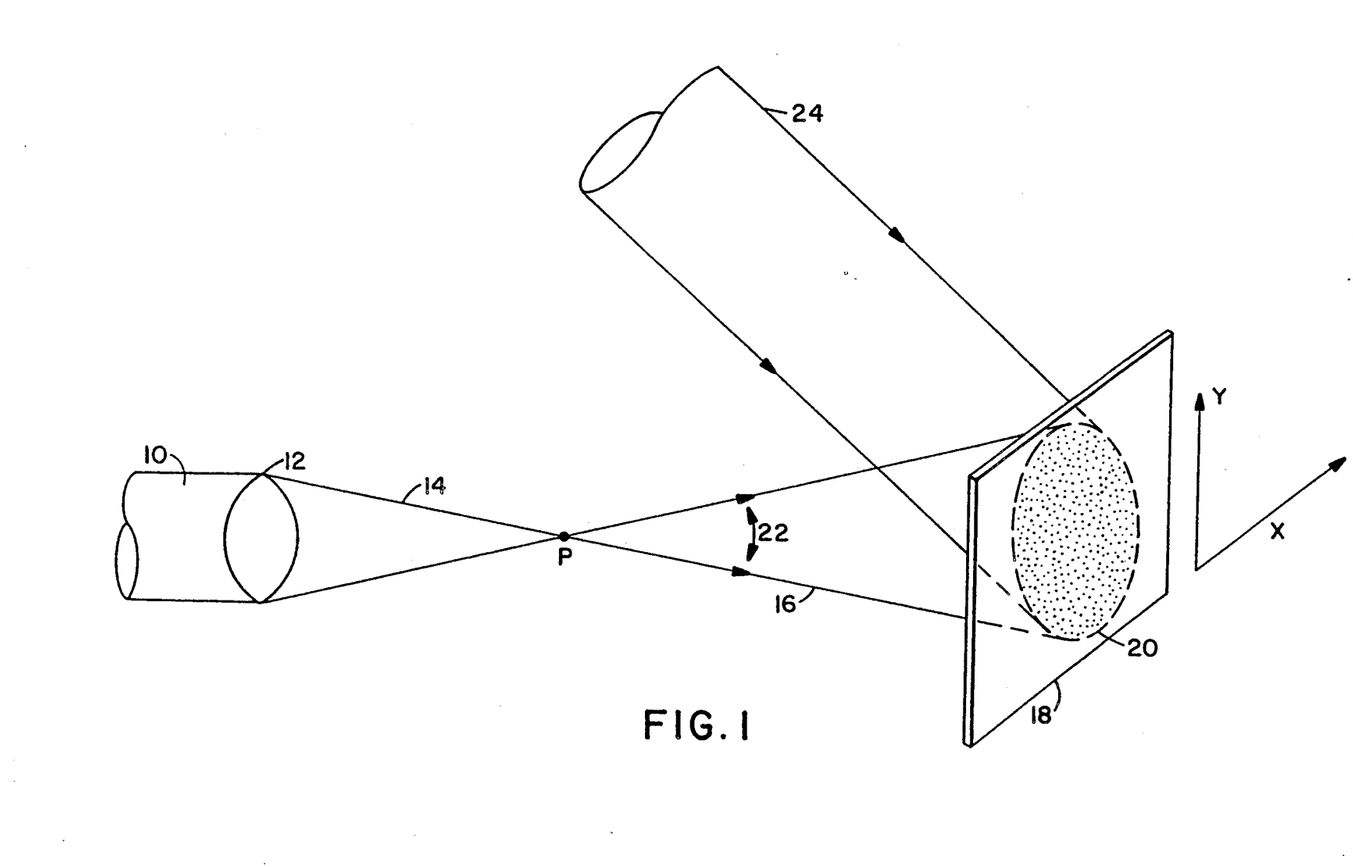
FIG. 1 schematically shows the set up for fabricating an uniformly exposed multiple holographic lens.

Referring now to the drawings, in the step and repeat method of fabricating a master holographic lens, as illustrated in FIG. 1, a light beam 10 is directed through a lens 12 which focuses a converging beam 14 to a point P, the focal point of lens 12. A diverging light beam 16 expands beyond point P and is directed toward a master recording plate 18 having a film emulsion to illuminate the area 20 covering substantially the entire recording plate 18. The light beam 16 acts as the object beam in the fabrication of the master lens. The light beam 10 is preferably generated from a coherent light source not shown. Typically, the light source is a laser. The lens 12 may be an ordinary spherical lens or any type of high quality lens. In addition, in the illustrative embodiment shown in FIG. 1, the light beam 10 is collimated, however, expanding or converging beams may also be used. The lens 12 preferably has a small f-number which results in the diverging object beam 16 having a large angle 22 in order to cover as large an area of the master recording plate 18 as possible. The f-number of a lens is defined as the ratio of its focal length to its diameter.

A reference beam 24 is directed towards the master recording plate 18 to illuminate the area 20 simultaneously with the object beam 16 to produce an interference fringe pattern. The master plate 18 is then exposed to record the fringe pattern which when developed will form an individual lens element having an individual focal point. The reference beam 24 is typically coherent light from the same source producing beam 10 and is usually collimated light. However, it is not necessary that light beam 24 be from the same source as light beam 10 but only that the beam 24 have identical phase and amplitude characteristics as beam 10. After the first exposure of the superposed reference beam 24 and object beam 16, the recording plate 18 is translated in the x and y directions in small increments and a plurality of exposures are made to record the desired number of interference patterns. Each of the interference patterns overlaps over the entire recording plate 18 and defines an individual lens element having a separately oriented focal point. Each of the interference fringe patterns is independent of every other since they are produced one at a time without any relationship. By recording over the whole plate 18, individual imperfections at small portions of the plate are attenuated.

The pattern and spacing of the lens elements is arbitrary and may be chosen according to the specific application, since the same pattern and spacing will be transposed to the final coherently exposed multiple lens. When all of the interference patterns have been exposed, the plate 18 is developed by suitable means to produce the uniformly exposed master multiple holographic lens.

Figure 2A:
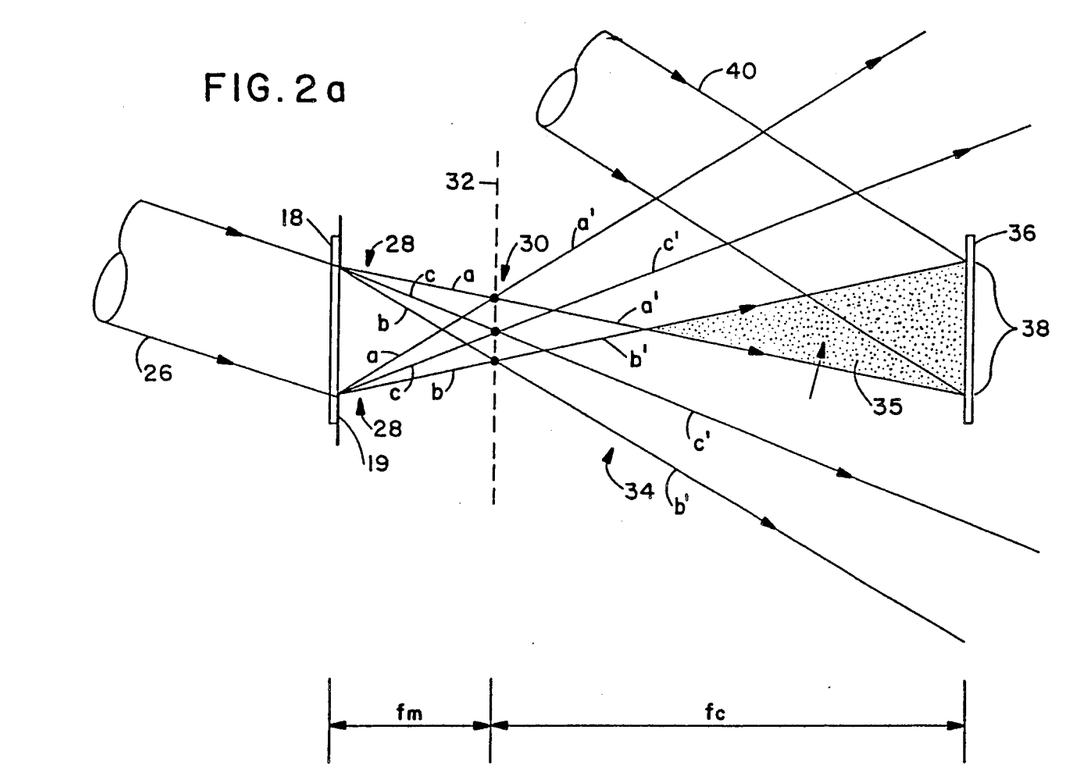
FIG. 2a schematically shows the set up of one embodiment for exposing the coherently exposed multiple holographic lens of the invention.

In the step in the inventive process, the master lens 18 is used to fabricate the final multiple holographic lens in a single exposure. The master multiple holographic lens 18, as shown in FIG. 2a, is illuminated with a reconstruction light beam 26 from a coherent source not shown. The master lens 18 generates a plurality of light waves 28 equal in number to the number of lens elements on the master multiple holographic lens 18. An aperture 19 may be positioned over the master multiple holographic lens 18 in order to limit the f-number of the array of light beams 28. For convenience, only three of the plurality of light waves 28 are shown in FIG. 2a. A first light wave is contained within the boundary lines aa, a second light wave is contained within the boundary lines bb, and a third light wave is contained within boundary lines cc. The plurality of light waves 28 forms an array of focused spots 30 beyond the master multiple holographic lens 18 in a focal plane 32. The focused spots 30 are the focal points of the master lens 18. The number, spacing and pattern of the focused spots in the array 30 is equal to the number, spacing and pattern of lens elements recorded on the master multiple holographic lens 18. The focused spots in array 30 represent a real holographic image of the master lens 18.

A plurality of diverging light waves 34 expand beyond the focal plane 32 and overlap in an area 35 downstream of the master holographic lens 18. A holographic recording medium 36, in the form of a recording plate having a photosensitive emulsion thereon, is positioned downstream of the master multiple holographic lens 18 such that an area 38 on the medium 36 is illuminated simultaneously by each of the plurality of light waves 34. The three diverging light waves of the plurality of light waves 34 shown in FIG. 2a are defined by lines a'a', b'b' and c'c'. The area 38 of the holographic recording medium 36 on which the overlapping light beams 34 in the area 35 represents the light amplitude contributions from all of the lens elements on the master lens 18 simultaneously.

A second reference beam 40 is directed from a coherent source toward the area 38 of the holographic recording medium 36 where the array of light beams 34 in area 35 overlap. The holographic recording medium 36 is then exposed simultaneously to the array of overlapping light beams 34 in area 35 and the reference beam 40 to thereby record the real image of the individual lens elements of the master holographic lens 18 with a single exposure. As the plate 36 is essentially used to record a copy of the master plate 18, the plate 36 is referred to as a copy plate. The holographic recording medium 36 is then developed to form a coherently exposed multiple holographic lens. As with the fabrication of the master lens 18, typically, the master reconstruction beam 26 and the copy reference beam 40 are collimated light usually produced by a laser. In addition, the master beam 26 and copy reference beam 40 are preferably generated by the same laser source.

Figure 2B:
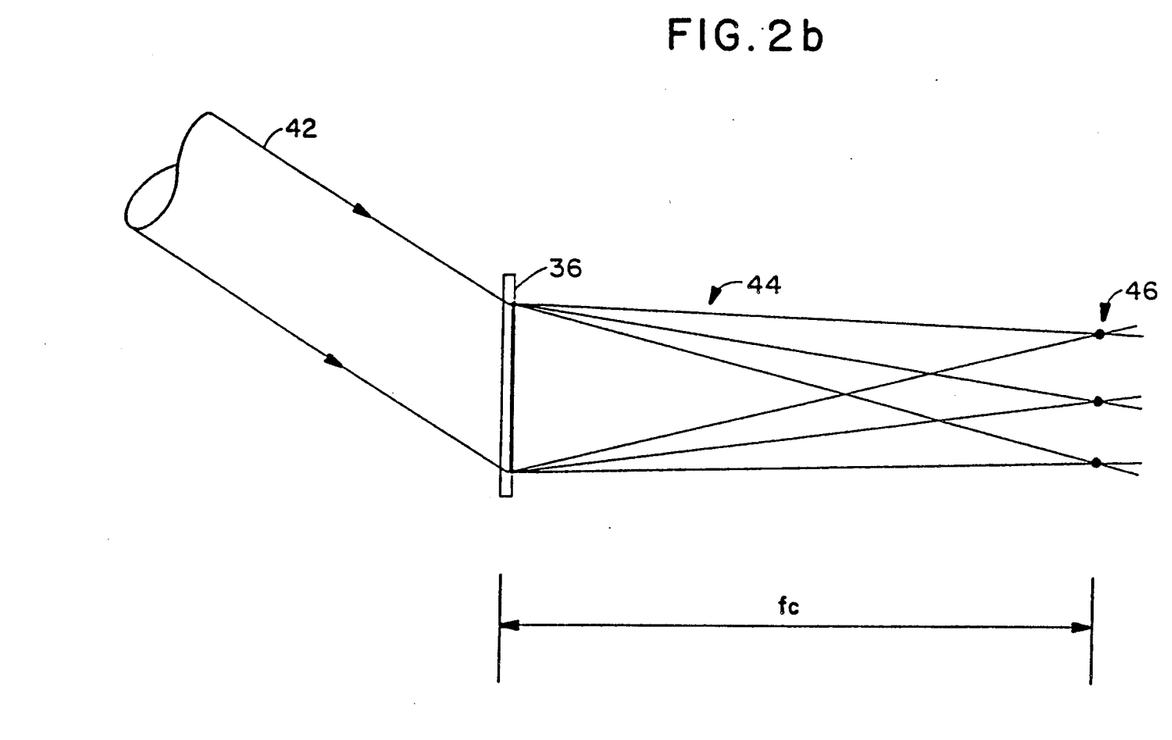
FIG. 2b schematically shows the set up for playback of the coherently exposed multiple holographic lens of the invention.

As shown in FIG. 2b, the coherently exposed multiple holographic lens 36 is then utilized by illuminating the lens 36 with a reconstruction beam 42 to holographically reconstruct the wavefronts recorded on the lens 36. A plurality of light waves 44 are generated out of the lens 36 and produce an array 46 of focused spots representing the real image of the master plate. The number, pattern and spacing of the array 46 is identical to that of the master lens 18. The plurality of light wavefronts 44 have a diffraction efficiency greater than that obtained with the incoherently exposed multiple holographic lens. The optical intensity of each of the light waves in array 44 is equally divided among the focal points 46.

The focal length, $f_c$, of the coherently exposed multiple holographic lens 36 is shown in FIG. 2b as the distance between the lens 36 and the array of focused spots 46. This focal length is determined by the positioning of the recording medium 36 prior to exposure thereof. As shown in FIG. 2a, the focal length $f_c$ between the focal plane 32 and the recording medium 36 is identical to the $f_c$ on playback as shown in FIG. 2b. The distance between the master multiple holographic lens 18 and the focal plane 32 in FIG. 2a is defined as the focal length, $f_m$, of the master lens 18. This focal length $f_m$ is equal to the distance between the focal point P and the recording medium 18 shown in FIG. 1. Thus, the focal length of the coherently exposed multiple holographic lens 36 can be selected by setting the distance between the master multiple holographic lens 18 and the holographic recording medium 36 prior to exposure. However, in a system where the distance between the lens 18 and the recording medium 36 is predetermined, the focal length $f_c$ may be selected by varying the focal length $f_m$ in the fabrication of the master multiple holographic lens. This can be accomplished by selecting the focal length for lens 12 of FIG. 1 to result in the desired distance between focal point P and the recording medium 18.

Figure 3:
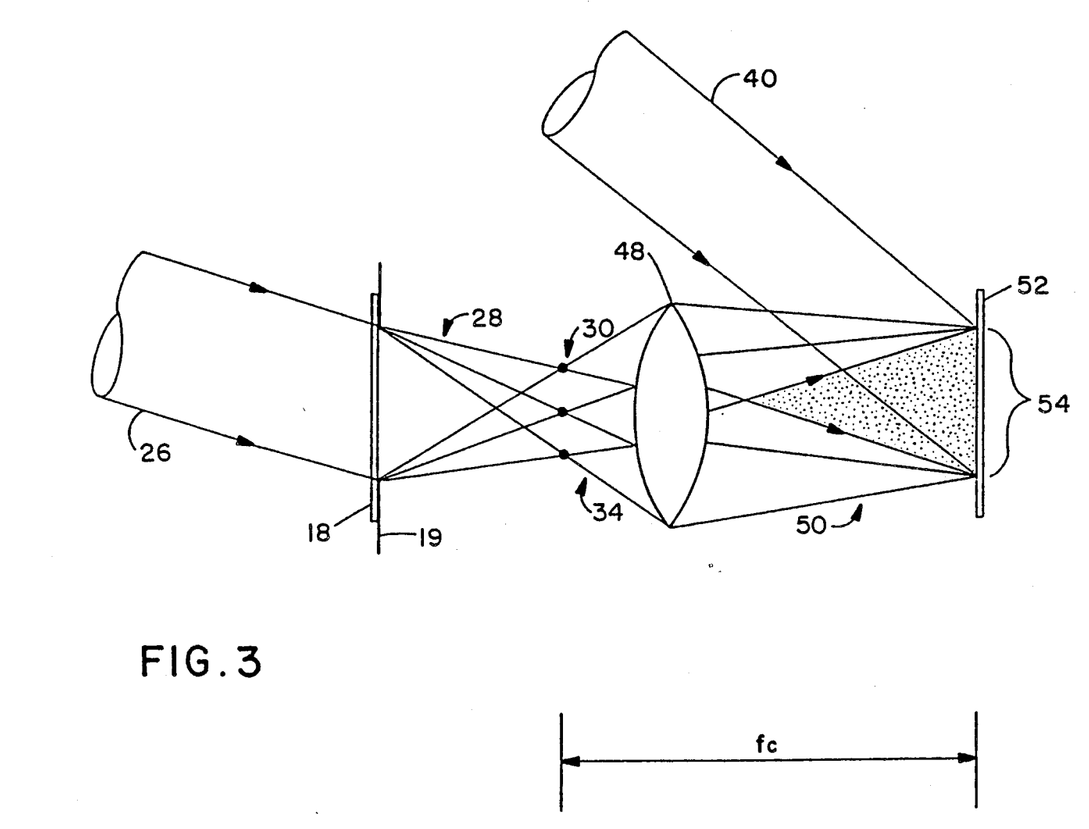
FIG. 3 schematically shows the set up of another embodiment for exposing the coherently exposed multiple holographic lens utilizing a single imaging lens.

FIG. 3 shows another embodiment of the invention in which the real holographic image is again used as the object beam to holographically record the lens elements in a single exposure. In this embodiment, an imaging lens 48 is positioned between the master holographic lens 18 and the recording medium 52 which provides a larger region of overlap on the copy plate 52. The imaging lens 48 receives and redirects the plurality of wavefronts 34 into diverging light beams 50. The coherent beams 50 contain all the light collected by the lens 48 from the wavefronts 34 emanating from each of the focused spot array 30. The coherent diverging beams 50 completely illuminate the area 54 of the holographic recording medium 52 simultaneously. The lens 48 superposes the coherent diverging light beams 50 over a larger area of the recording medium 52 than is accomplished in the embodiment shown in FIG. 2a. Playback of the holographic lens 52 is performed in a similar manner as shown in FIG. 2b in which a reconstruction beam illuminates the holographic lens 52 to produce an array of focused spots. The distance between the holographic lens 52 and the array of focused spots, the focal length of lens 52, is determined by the position of the lens 48 with respect to the focused spot array 30, and the location of the recording medium 52.

The larger area of overlap 54 provides a more uniform distribution of the light intensity in the array of light beams emanating from the individual lens elements in the final lens 52 on playback. However, the focal length of the coherently exposed multiple holographic lens 52 need not be the same as the master plate 18. In addition, the separation between the array of focused spots on playback will also be different from the lens 18. This is due to the choice of focal length for lens 48 and the location of lens 48 between the plates 18 and 52. Typically, the focal length of the master lens 18 will be less than the focal length of image lens 48. Therefore, the array of focused spots 30 will be inside the focal length of the lens 48 which results in a redirection of the spherical wavefronts emanating from each focal point in the array 30. This redirection permits the wavefronts from the array to overlap more completely at the recording medium 52.

Figure 4:
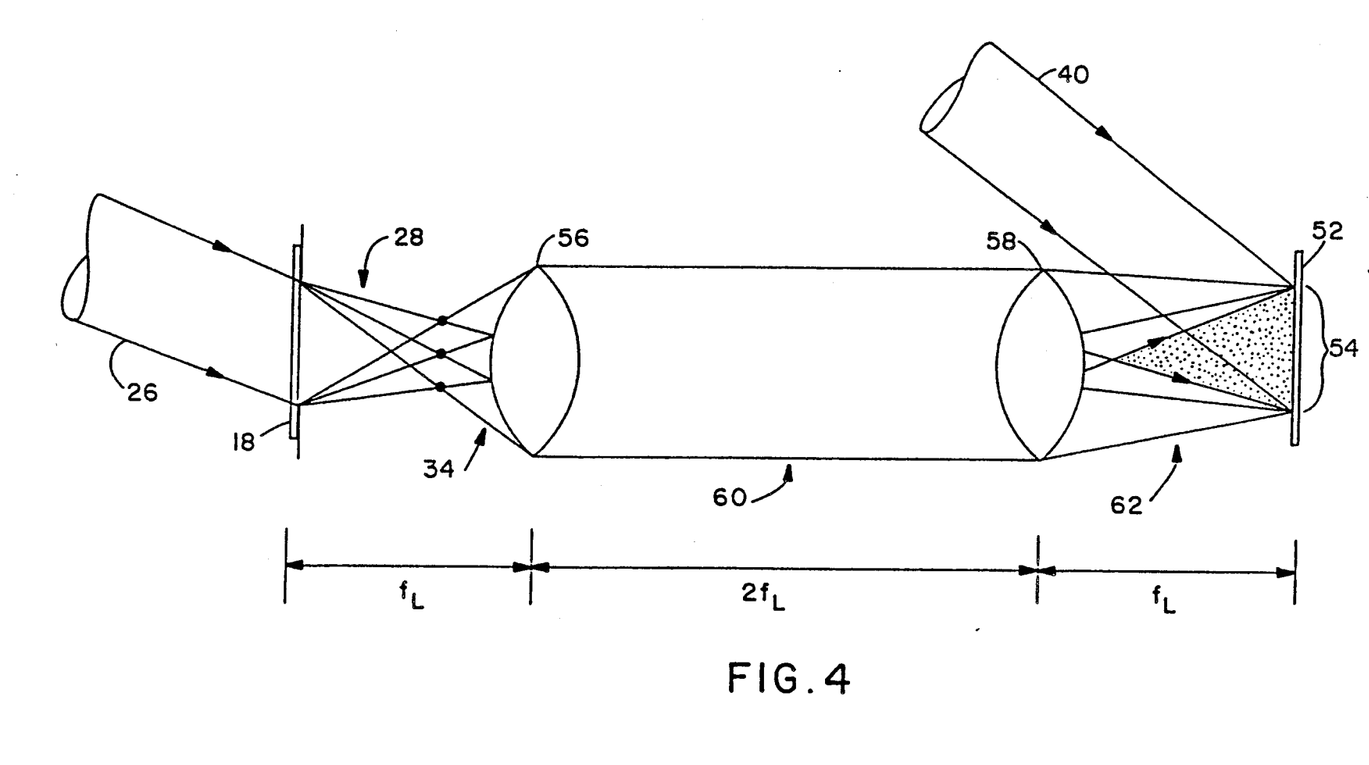
FIG. 4 schematically shows the set up of another embodiment for exposing the coherently exposed multiple holographic lens using a pair of imaging lens.

In addition to changing the focal length of the coherently exposed multiple holographic lens 52, lens 48 introduces a slight phase distortion in the array of light beams 50 resulting in a potential reduction in quality during playback. A modification of the embodiment shown in FIG. 3 is shown in FIG. 4 which includes a pair of imaging lenses 56 and 58 positioned in parallel between the plates 18 and 52. For simplicity, the focal length of both lenses 56 and 58 are assumed to be equal to $f_L$. The lens 56 similar to lens 48 captures and redirects the plurality of light waves 34 and directs these light waves to lens 58. The redirected array of light waves 60 are captured by lens 58 and again redirected into wavefronts 62 having their original phase relationship prior to completely overlapping on plate 52. Thus, the conventional two lens system causes the plurality of light waves 62 to be incident upon the copy plate 52 with no phase distortion present in array 54. However, the magnification, spacing and focal length of the lens elements on the lens 52 are also changed from that of master plate 18. If a one-to-one relationship is desired to be made between the master plate 18 and the plate 52, the lenses 56 and 58 must be arranged such that the spacing between the holographic lens master plate 18 and the copy holographic lens 52 is four times the focal length of the lenses 56 and 58 wherein the focal length of each of the lenses 56 and 58 is equal. In this arrangement, as shown in FIG. 4, the lens spacing must be set so that the distance between the plate 18 and the lens 56 is equal to one focal length $f_L$, where $f_L$ is equal to the focal length of the lenses 56 and 58. The distance between lenses 56 and 58 must be $2f_L$ and the distance between 58 and 52 must be $f_L$. This will permit the entire real image of the master plate 18 to be transposed onto recording medium 52. The resulting lens 52 will have identical focal length, f-number and the spacing between the lens elements as that of master plate 18.

Figure 5:
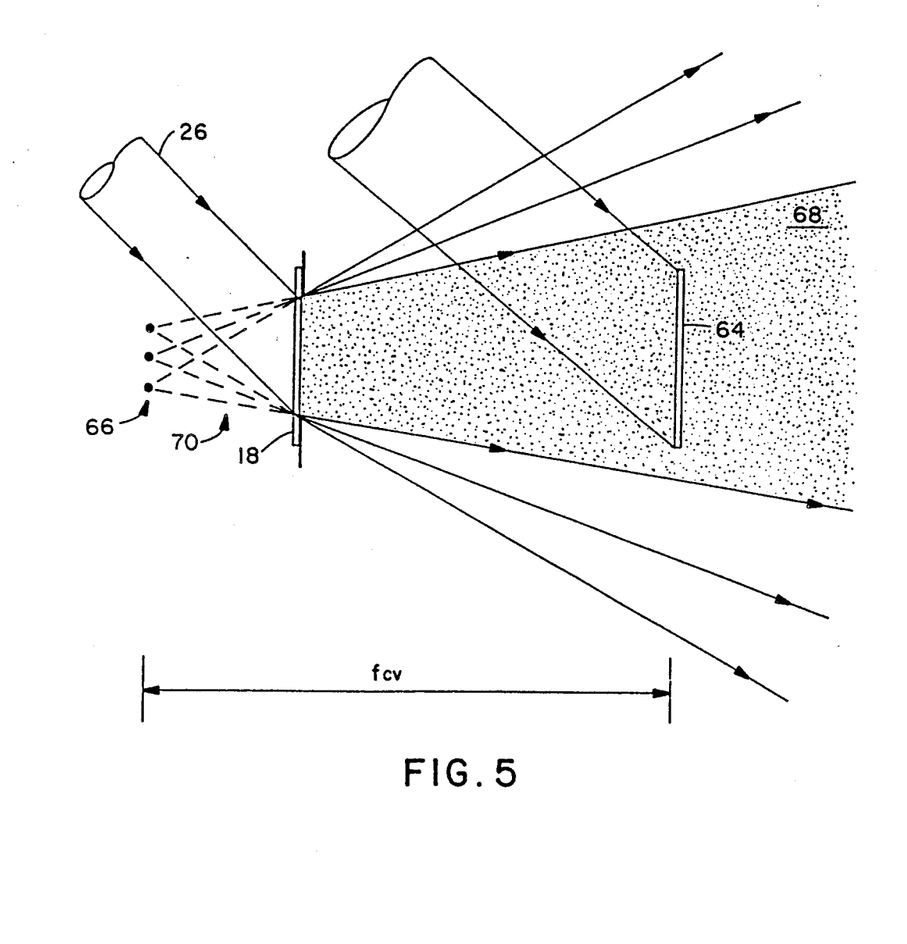
FIG. 5 schematically shows a set up for exposing the coherently exposed multiple holographic lens for recording the virtual image of the lens elements.

An alternative embodiment to that shown in FIG. 2 is shown in FIG. 5 wherein the virtual image of the master multiple holographic lens 18 is utilized to fabricate the coherently exposed multiple holographic lens 64. In any holographic playback there are two images that are displayed, the real image and the virtual image. The real image array is as shown in FIG. 2a. FIG. 5 shows the location of an array 66 of focused spots forming the virtual image. The virtual image array 66 lies to the left of the master multiple holographic lens 18. The recording medium 64 is positioned in the overlapping region 68 to record the virtual image of the lens elements of the master lens 18. The overlap region 68 of the plurality of virtual image wavefronts 70 is relatively large providing for freedom in positioning of the recording medium 64. A reference beam 72 is used to record the interference fringe pattern of the overlapping beams on the copy plate 64. The focal length, $f_{cv}$, of the resulting coherently exposed multiple holographic lens 64 is shown as the distance between the virtual image array 66 and the recording medium 64. Thus, the focal length of the lens 64 is greater than the separation between the master lens 18 and the recording medium 64. In the illustrative embodiment of FIG. 5, the master reconstruction beam 26 is shown as being directed to the master lens 18 at an acute angle to the plane of the lens 18 resulting in the virtual image array and overlap region being projected as shown.

While preferred embodiments of the subject invention have been described and illustrated, it is obvious that various changes and modifications can be made therein without departing from the spirit of the present invention which should be limited only by the scope of the appended claims.

What is claimed is:

1. A method of fabricating a simultaneously exposed multiple holographic lens comprising the steps of:

(a) fabricating on a photographic plate a sequentially exposed master multiple holographic lens formed from interference patterns of superimposed coherent light, said master lens comprising an array of sequentially exposed holographic lens elements, each of said lens elements substantially covering the entire area of the photographic plate and being fabricated by the method comprising the steps of, selecting a focusing lens having a desired focal length and f-number, directing a fabricating light beam from a coherent source through said focusing lens, positioning a master holographic recording medium downstream of said focusing lens such that a first area therein will be illuminated by said fabricating light beam, directing a reference beam of light from the coherent source toward the area of the master holographic recording medium illuminated by said fabricating beam, exposing the master holographic recording medium to the fabricating and reference beams simultaneously to holographically record on an interference pattern having a first focal point, positioning the master recording medium such that a second area thereon, overlapping said first area, will be illuminated by the fabricating and reference light beams simultaneously, exposing the master holographic recording medium to the fabricating and reference beams simultaneously to holographically record an interference pattern having a second focal point spaced from said first focal point, repeating the positioning and exposing steps until a desired number of interference patterns are recorded having a desired number of spaced focal points, and developing the master holographic recording medium to form said sequentially exposed master multiple holographic lens having an array of lens elements corresponding to the desired number of interference patterns;

(b) illuminating the master multiple holographic lens with a first beam of light from a coherent source to provide a plurality of refracted light waves equal in number to the number of lens elements;

(c) positioning a holographic recording medium such that an area thereon is illuminated simultaneously by each of the plurality of refracted light waves;

(d) directing a second beam of light from the coherent source toward the area of the holographic recording medium illuminated by the plurality of refracted light waves;

(e) exposing the holographic recording medium simultaneously to the second beam of light and the plurality of refracted light waves; and (f) developing the holographic recording medium to form a simultaneously exposed multiple holographic lens therefrom.

2. The method of claim 1 wherein a desired focal length of the simultaneously exposed multiple holographic lens is selected by setting a distance between the master multiple holographic lens and the holographic recording medium prior to exposure thereof.

3. The method of claim 2 further including the steps of positioning an imaging lens means for receiving and redirecting the plurality of refracted light waves so that of the light collected by said imaging lens means from the light emanating from each of the plurality of refracted light waves completely illuminates an area of said holographic recording medium simultaneously.

4. The method of claim 3 wherein the step of positioning an imaging lens means includes positioning a single imaging lens.

5. The method of claim 4 wherein the desired focal length of the simultaneously exposed multiple holographic lens is selected by selecting the focal length and the position of the single imaging lens relative to the master multiple holographic lens and the recording medium prior to exposure thereof.

6. The method of claim 5 wherein the single imaging lens is positioned such that the focal length of the master lens is less than the focal length of the imaging lens.

7. The method of claim 3 wherein the step of positioning an imaging lens means includes positioning a pair of spaced imaging lenses along a common optical axis to eliminate phase distortions during usage of the multiple holographic lens.

8. The method of claim 7 wherein the desired focal length of the simultaneously exposed multiple holographic lens is selected by selecting the focal length and position of each of the imaging lenses relative to the master holographic lens and the recording medium prior to exposure thereof.

9. The method of claim 8 wherein the focal length of each of the imaging lenses is equal and the distance between the first and second multiple holographic lenses is equal to four times the focal length of the imaging lenses.

10. The method of claim 1 wherein the step of illuminating the master multiple holographic lens provides a first and second plurality of refracted light waves, each of said first and second plurality of light waves being equal in number to the number of lens elements, said first plurality of refracted light waves producing a real holographic image of the lens elements and the second plurality of refracted light waves producing a virtual holographic image of the lens elements.

11. The method of claim 10 wherein the recording medium is positioned to record the real image.

12. The method of claim 10 wherein the recording medium is positioned to record the virtual image.

* * * * *

UNITED STATES PATENT AND TRADEMARK OFFICE
CERTIFICATE OF CORRECTION

PATENT NO. : 4,998,787

DATED : March 12, 1991

INVENTOR(S) : Stephen J. Caputi, et al.

It is certified that error appears in the above-identified patent and that said Letters Patent is hereby corrected as shown below:

ON THE TITLE PAGE:

In the Abstract, line 25: "lenses" should read as --lens--

In the Abstract, line 26: "lens" should read as --lenses--

In the Abstract, line 27: "meidum" should read as --medium--

Column 5, line 15: "the step" should read as --the next step--

Column 9, lines 23-24: "that of" should read as --that all of--

Signed and Sealed this

Twentieth Day of October, 1992

*Attest:*

DOUGLAS B. COMER

*Attesting Officer*     *Acting Commissioner of Patents and Trademarks*